US009245097B2

(12) United States Patent
Gupta

(10) Patent No.: US 9,245,097 B2
(45) Date of Patent: Jan. 26, 2016

(54) SYSTEMS AND METHODS FOR LOCKING AN APPLICATION TO DEVICE WITHOUT STORING DEVICE INFORMATION ON SERVER

(71) Applicant: Infosys Limited, Bangalore (IN)

(72) Inventor: Deepak Gupta, Bangalore (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 14/489,392

(22) Filed: Sep. 17, 2014

(65) Prior Publication Data
US 2015/0082026 A1 Mar. 19, 2015

(30) Foreign Application Priority Data
Sep. 19, 2013 (IN) ............................ 4211/CHE/2013

(51) Int. Cl.
H04L 29/06 (2006.01)
G06F 21/12 (2013.01)
H04L 29/08 (2006.01)
(Continued)

(52) U.S. Cl.
CPC ............ G06F 21/121 (2013.01); G06F 21/123 (2013.01); G06F 21/44 (2013.01); G06F 21/72 (2013.01); H04L 67/10 (2013.01); H04W 4/00 (2013.01); G06F 2221/07 (2013.01); G06F 2221/2107 (2013.01); G06F 2221/2147 (2013.01); H04W 12/06 (2013.01)

(58) Field of Classification Search
CPC ..... G06F 21/121; G06F 21/123; G06F 21/44; G06F 21/72; H04L 67/10; H04W 4/00
See application file for complete search history.

(56) References Cited

U.S. PATENT DOCUMENTS 7,269,665 B2 * 9/2007 Pauly ..................... G06Q 30/06
709/245
7,334,265 B1 2/2008 Morishita
(Continued)

FOREIGN PATENT DOCUMENTS

WO WO 2006/101765 9/2006
WO WO 2012/126077 9/2012

OTHER PUBLICATIONS

"Formal Security Analysis of Electronic Software Distribution Systems," http://www.avantssar.eu/pdf/publications/SAFECOMP08.pdf, downloaded Aug. 27, 2014, 14 pages.
(Continued)

Primary Examiner — Techane Gergiso
(74) Attorney, Agent, or Firm — Klarquist Sparkman, LLP

(57) ABSTRACT

A system and method for locking an application to specific hardware device without storing device or user information on server. A lock registration is performed during the first usage of the application where the application sends a unique value to the server through secured channel. This unique value is combination of user specific information and device information. The server receives the unique value, and sends the encrypted value to the device, which is stored in predefined location of device. During lock validation, which is initiated during every request to the server or on every session creation, the device unique value and encrypted value is sent to the server. The server receives it, decrypts the encrypted value, and compares with the received unique value. If both the values are same, the server validates application instance by sending the response to the device else error message is sent to the device.

16 Claims, 5 Drawing Sheets

(51) Int. Cl.
  *G06F 21/44* (2013.01)
  *G06F 21/72* (2013.01)
  H04W 4/00 (2009.01)
  *H04W 12/06* (2009.01)

(56) References Cited

U.S. PATENT DOCUMENTS

| | | | |
|---|---|---|---|
| 8,261,359 B2 | 9/2012 | Levine et al. | |
| 8,938,809 B2* | 1/2015 | Chaudhury | G06F 21/6218 713/164 |
| 9,027,089 B2* | 5/2015 | Cen | H04L 63/08 709/227 |
| 2006/0064756 A1 | 3/2006 | Ebert | |
| 2011/0099376 A1* | 4/2011 | Gupta | H04L 9/321 713/171 |
| 2014/0108599 A1* | 4/2014 | Borzycki | G06F 21/6218 709/217 |
| 2014/0379853 A1* | 12/2014 | Shelton | H04L 67/10 709/217 |

OTHER PUBLICATIONS

"Lizard Guardian Copy Protection," Software Copy Protection, downloaded Aug. 27, 2014, http://www.locklizard.com/software_copy_protection.htm, 2 pages.

* cited by examiner

SYSTEMS AND METHODS FOR LOCKING AN APPLICATION TO DEVICE WITHOUT STORING DEVICE INFORMATION ON SERVER

FIELD OF TECHNOLOGY

The present disclosure relates generally to locking application to a hardware device, and in particular, to a system and method for locking an application to a hardware device without storing user and device information on server.

BACKGROUND

Presently, there is no clear solution available in the market or in the OSS world that can reliably lock the installed application to the device without actually storing some application specific information on the server. Existing technologies rely on storing information of application, user and device at the server side, which may not be optimal in all scenarios as it will require additional infrastructure to store and protect the user and device specific information on server. Existing methods rely on application registration processes that involve data persistence on the server. This is not ideal for systems with dynamic user bases, as the server would then have to deal with the additional overhead of maintenance and security of such data.

SUMMARY

Disclosed are a method, an apparatus and/or a system for locking an application to a hardware device without storing device information on a server.

In one aspect, a method includes receiving a first unique value of a device on first usage of an application, wherein the first unique value is derived based on one or more device parameters. The first unique value received from the device is encrypted by the server. The encryption result is sent to the device, where the encryption result is stored in a predefined location of the device. A second unique value of the device and the encryption result at the subsequent usage of the application is received by the processor, where the second unique value is derived based on the one or more device parameters. The server decrypts the encryption result to get the first unique value received at the time of first usage of the application. The server decrypts the first unique value and the received second unique value, and validates the device if the first unique value and the second unique value are identical.

In another aspect, a system for lock validation is disclosed. The system includes, a first unique value receiving component, a first unique value encryption component, an encryption result sending component, a second unique value and encryption result receiving component, an encrypted value decrypting component, an unique value comparison component, a device validation component, and an error message sending component. The first unique value receiving component is configured to receive first unique value sent by the native application at the first usage. The first unique value is derived based on one or more device parameters. The first unique value encryption component is configured to encrypt the first unique value received from the device. The encryption result sending component is configured to send the encrypted result back to the device, where the result is stored in pre-defined location on the hardware device. The second unique value and encryption result receiving component is configured to receive a second unique value and the encryption result from the device at the subsequent usage of the application. The second unique value is derived based on one or more device parameters. The encrypted result decryption component is configured to decrypt the encryption result to get the first unique value received at the time of first usage of the application. The unique value comparison component is configured to compare the decrypted first unique value with the received second unique value. The device validation component is configured to validate the device if the first unique value and the second unique value are identical.

In an additional aspect, a computer readable storage medium for locking application to a hardware device is disclosed. The computer readable storage medium receiving a first unique value of a device when an application is invoked for the first time, wherein the first unique value is derived based on one or more device parameters, encrypting the first unique value received from the device, sending the encryption result to the device, wherein the encryption result is stored in a predefined location of the device, receiving a second unique value of the device and the encryption result at the subsequent usage of the application, wherein the second unique value is derived based on the one or more device parameters, decrypting the encryption result to get the first unique value received at the time of first usage of the application, comparing the decrypted first unique value and the received second unique value, and validating the device if the first unique value and the second unique value are identical.

BRIEF DESCRIPTION OF THE FIGURES

Example embodiments are illustrated by way of example and not limitation in the figures of the accompanying drawings, in which like references indicate similar elements and in which.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary embodiments of the present invention provide a system and method for locking an application to a specific hardware device without storing user or device information on a server. A lock registration is performed during the first usage of the application where the application sends a unique value to the server through secured channel. This unique value is combination of user specific information and device information. The server receives the unique value, and sends the encrypted value to the device, which is stored in pre-defined location of a device. During lock validation, which is initiated during every request to the server or on every session creation, the device unique value and encrypted value is sent to the server. The server receives it, decrypts the encrypted value, and compares with the received unique value. If both the values are same, the server validates application instance by sending the response to the device else error message is sent to the device.

Figure 1:
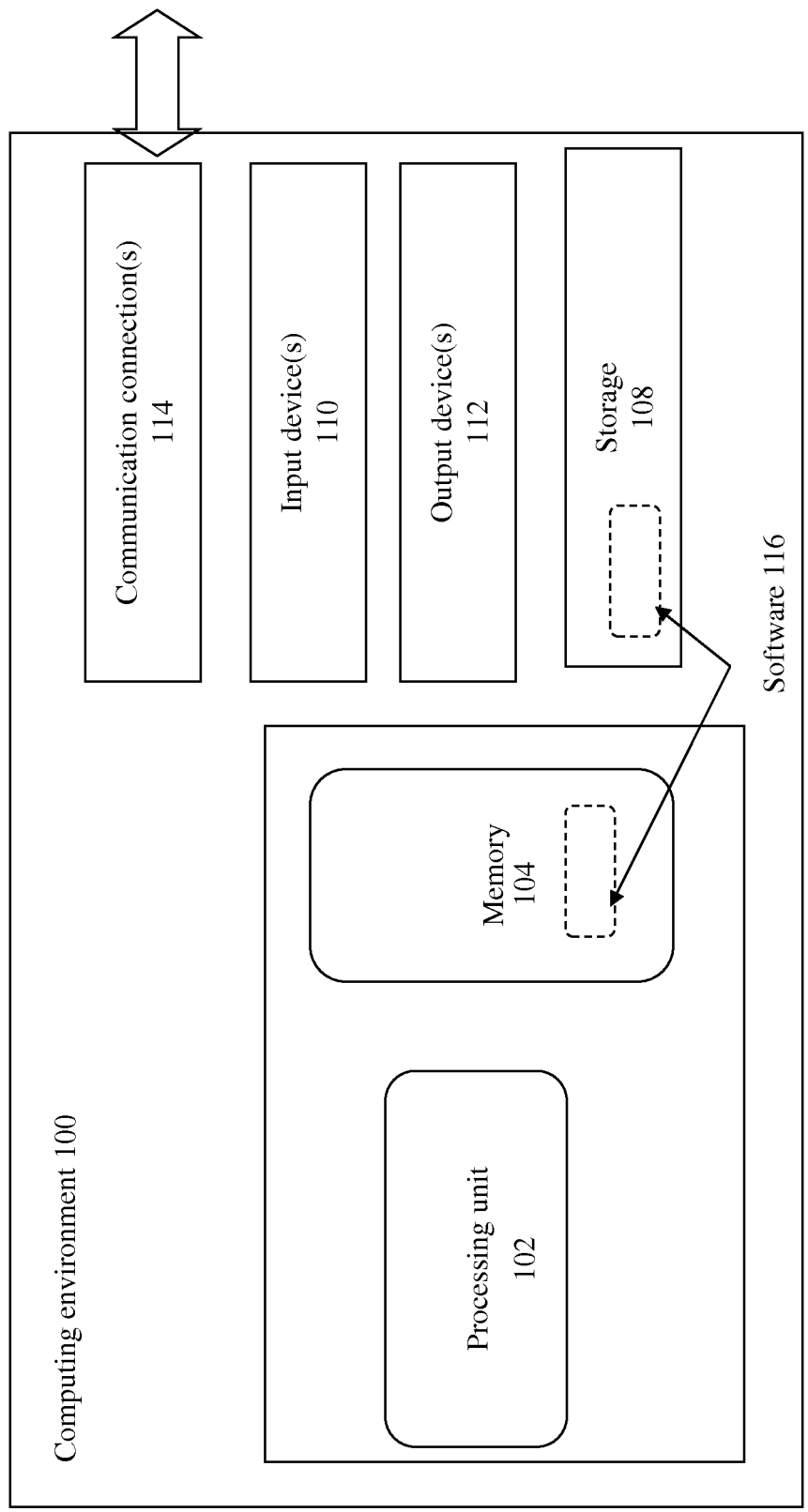
FIG. 1 is a computer architecture diagram illustrating a computing system capable of implementing the embodiments presented herein.

FIG. 1 illustrates a generalized example of a suitable computing environment 100 in which all embodiments, techniques, and technologies of this invention may be implemented. The computing environment 100 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multi-processor systems, microprocessor-based or programmable consumer electronics, network PCs, minicomputers, mainframe computers, a collection of client/server systems, and the like.

With reference to FIG. 1, the computing environment 100 includes at least one central processing unit 102 and memory 104. The central processing unit 102 executes computer-executable instructions. In a multi-processing system, multiple processing units execute computer-executable instructions to increase processing power and as such, multiple processors can be running simultaneously. The memory 104 may be volatile memory (e.g., registers, cache, RAM), non-volatile memory (e.g., ROM, EEPROM, flash memory, etc.), or some combination of the two. The memory 104 stores software 116 that can implement the technologies described herein. A computing environment may have additional features. For example, the computing environment 100 includes storage 108, one or more input devices 110, one or more output devices 112, and one or more communication connections 114. An interconnection mechanism (not shown) such as a bus, a controller, or a network, interconnects the components of the computing environment 100. Typically, operating system software (not shown) provides an operating environment for other software executing in the computing environment 100, and coordinates activities of the components of the computing environment 100.

Figure 2:
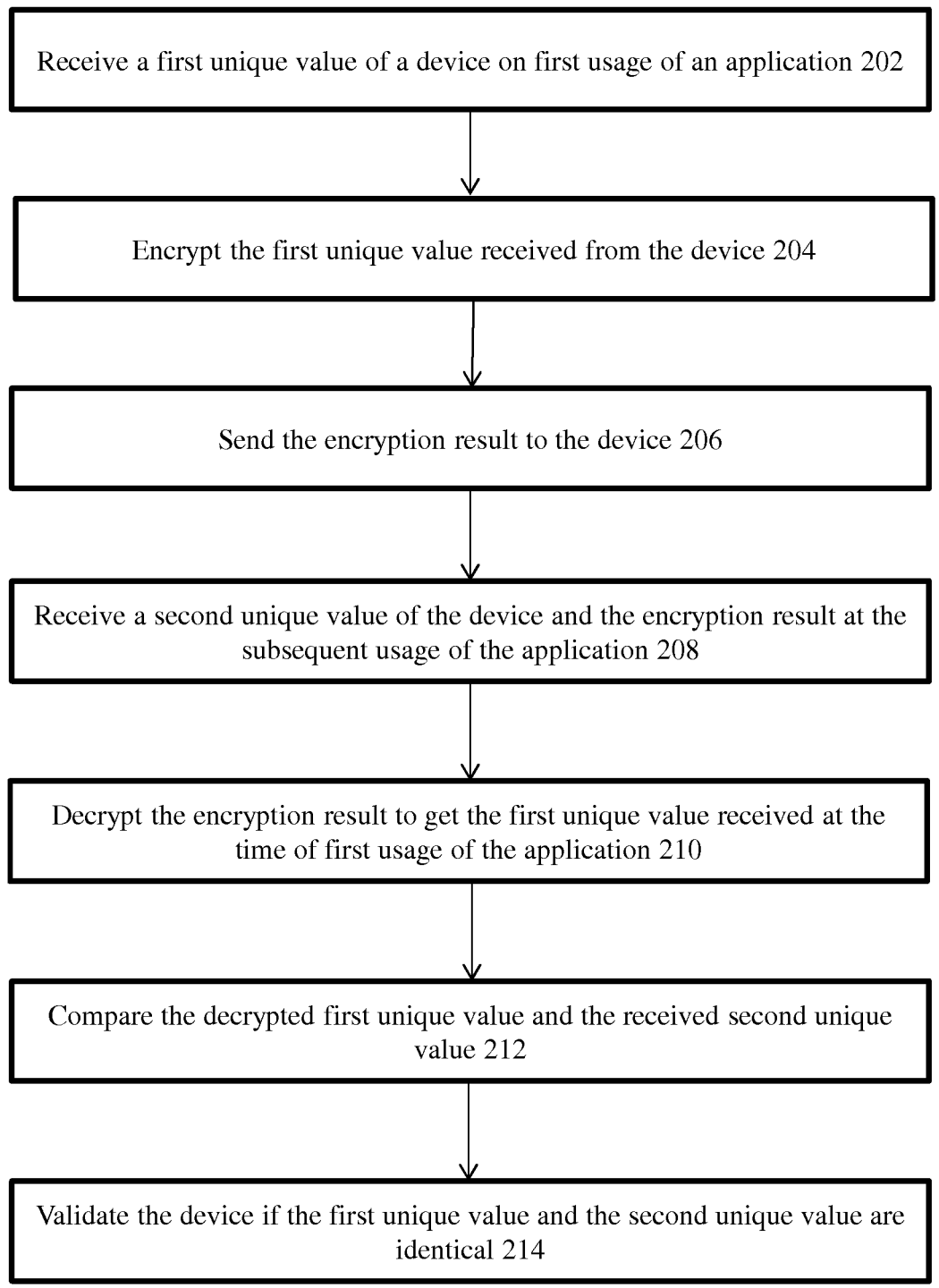
FIG. 2 is a flowchart, illustrating a method for locking an application to a device, wherein device information is not stored on server side, in accordance with embodiments of the present invention.

FIG. 2 is a flowchart, illustrating a method for locking an application to a specific hardware. This flowchart includes both lock registration and validation. A server receives a first unique value of a device on first usage of an application, as in step 202. The first unique value derived based on one or more device parameters and user specific information. A dedicated server interface receives the first unique value. The server encrypts the first unique value using a two-way encryption algorithm, as in step 204. The result of the encryption is sent back to the application over the secured channel, as in step 206. This encrypted unique value is stored at the pre-defined location on the hardware device. The hardware device determines whether the native application 204 is locked by searching for presence of the encrypted result in the predefined location on the hardware device.

Referring back to FIG. 2 is a flowchart, illustrating, the server receiving a second unique value and the encryption result in the subsequent usage of the application, as in step 208. The native application sends this information in the next usage, when lock validation happens. The server first retrieves the two values from the request and decrypts the encryption result to obtain the first unique value received at the first time of usage, as in step 210. The first unique value is compared with the second unique value, as in step 212. If the first unique value and the second unique value are same, this completes the validation process, as in step 214. If values are found unequal, then the requesting native application is deemed to have been tampered with or originating from an unauthorized device and the request is not honored.

Figure 3:
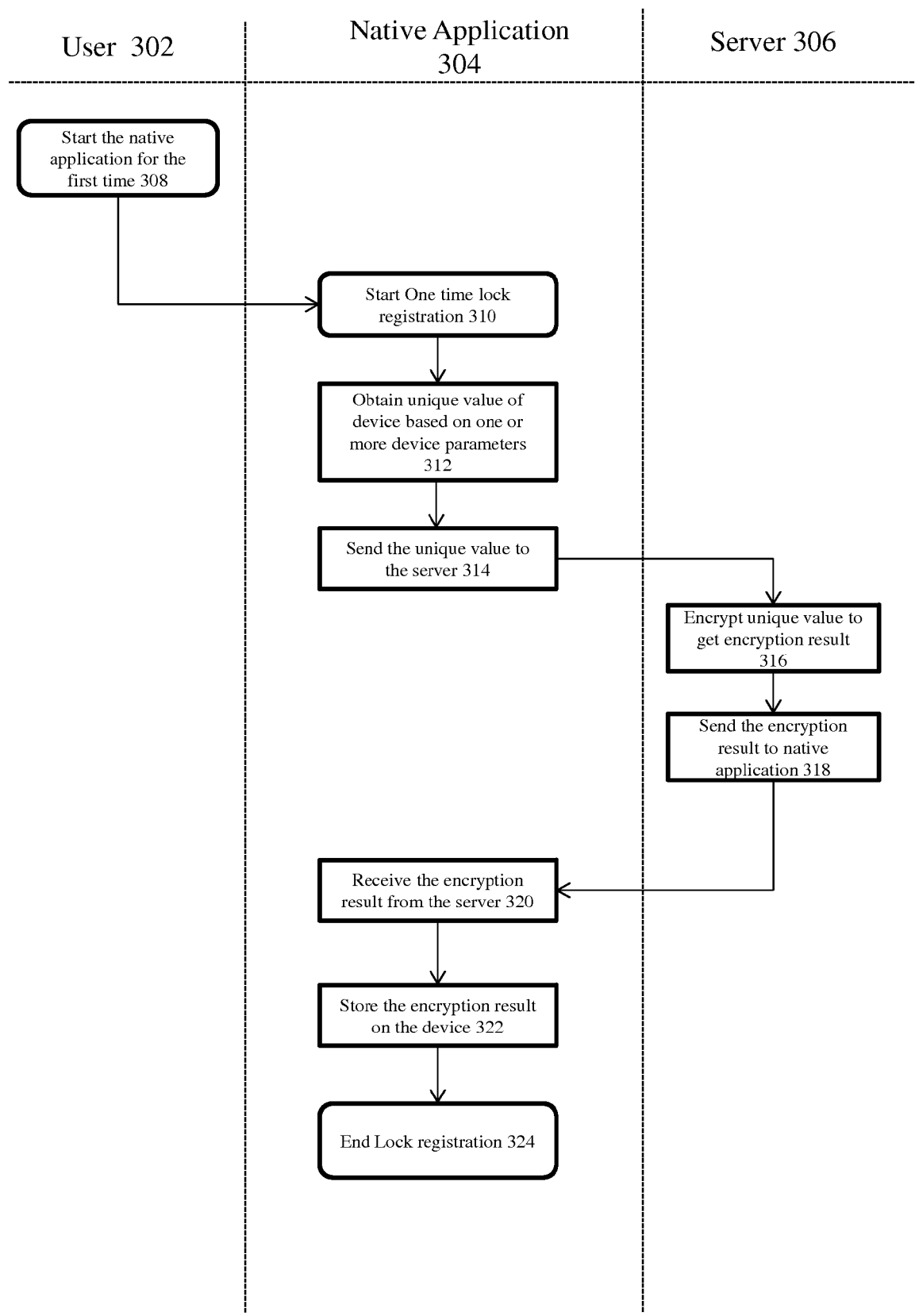
FIG. 3 is a flowchart, illustrating a method for performing lock registration to lock an application to a specific hardware, in accordance with an embodiment of the present invention.

FIG. 3 is a flowchart, illustrating a method for performing lock registration which happens at first time usage of a native application. A user 302 installs a native application 304 which communicates to a server 306. The user 302 starts the native application for the first time as in step 308. This happens when the native application is installed and invoked for the first time. Then the native application 304 starts one time lock registration 310. After one time lock registration is initiated, the native application 304 obtains a first unique value of the device based on one or more device parameters. The first unique value as a unique value used during lock registration. The device parameters will change based on the platform on which the native application 304 is installed. The unique ID of device is considered as the first unique value. In some embodiment, the first unique value is also the combination of device unique ID and user specific information. The user specific information may include user id, phone number. Here the device unique ID and user specific information are converted to form the first unique value using an arbitrary, pre-defined algorithm. This could be simple as concatenation of values. This first unique value is sent to the server over a secure channel as in 314. The server 306 receives the first unique value and encrypts the first unique value to get the encryption result using a strong 2-way encryption algorithm, as in 316. The server 306 sends the encryption result to the native the native application over the secured channel, as in 318. The native application 304 receives the encryption result from the sever 304, as in 320. The native application 304 then stores the received encrypted result at a pre-defined location on the hardware device as in 322. The hardware device determines whether the native application 304 is locked by searching for presence of the encryption result in the predefined location on the hardware device. This completes the lock registration process and reaches the end of lock registration, as in 324. Once the lock registration process is done, the native application 304 is made functional and is ready for normal use.

Figure 4:
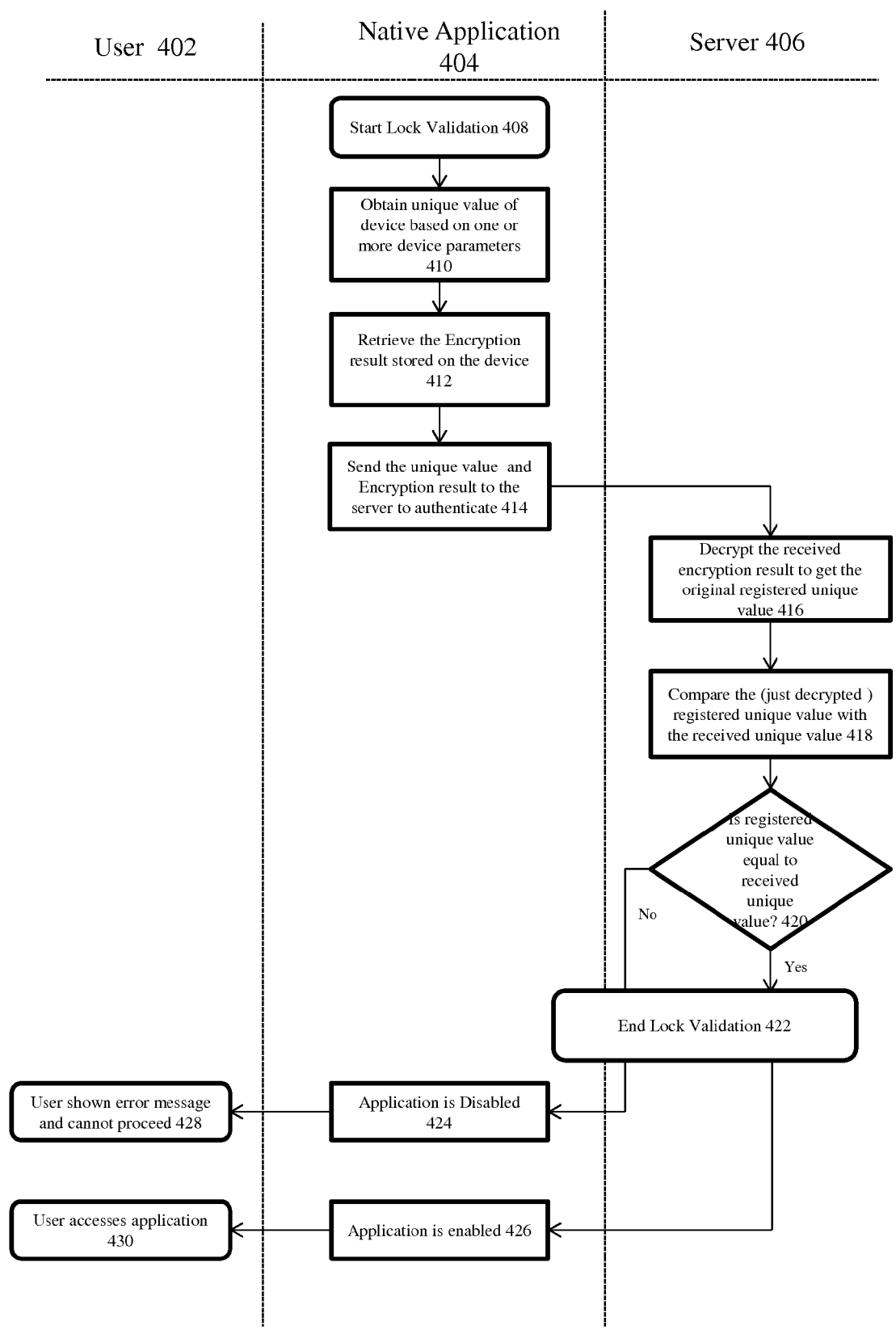
FIG. 4 is a flowchart, illustrating a method for performing lock validation to validate a native application installed in a specific hardware, in accordance with an embodiment of the present invention.

FIG. 4 is a flowchart, illustrating a method for performing lock validation of a native application 404 installed on a hardware device by a user 402. The lock validation is initiated when a data request is sent to the server for the first time by the native application 404. In another embodiment, the lock validation process in initiated on successive requests as well. Before the server 406 sends a response to the native application 404, lock validation is done. In another embodiment, the lock validation is done once in every session establishment with the server 406 by the native application 404. The native application starts the lock validation, as in 408. The native application 404 obtains a second unique value of a hardware device based on one or more device parameters, as in 410. The second unique value is a unique value used at the time of lock validation by the native application 404. The device parameters will change based on the platform on which the native application 404 is installed. The unique ID of device is considered as the second unique value. In some embodiment, the second unique value is also the combination of device unique ID and user specific information. The user specific information may include userid, phone number. Here the device unique ID and user specific information are converted to form the second unique value using an arbitrary, pre-defined algorithm. This could be simple as concatenation of values. The native application 404 retrieves the encryption result stored on the hardware device in a pre-defined location, as in 412. The native application 404 sends the second unique value and the encryption result to a server 406 to authenticate over a secured channel, as in 414. The server 406 receives the second unique value and the encryption result. The server 406 decrypts the encryption result to get the original registered unique value which is the first unique value as in 416. The server 406 compares the first unique value, which is the result of decryption with the second unique value received at the time of lock validation, as in 418. The decision is made based on the comparison 418, as in 420. This ends the lock validation process 422 at the server 406. The next step is to authenticate the hardware device on which the native application 404 is installed. If the first unique value which is the result of decryption and the received second unique value are identical, then the native application 404 is enabled, as in 426. The server 404 then will proceed to service the data request and sends the response to the native application 404 and user 402 can access the native application 404 on the hardware device, as in 430. If the first unique value and the second unique value are not identical, then the native application 404 is disabled, as in 424. An error message is sent to the user 402, where the user 402 cannot proceed with using the native application 404, as in 428.

The lock validation process may be executed each time the native application 404 requests the data from the server 406 under normal operation or it could be done once per session i.e., each time the user 402 starts the native application 404. In the latter case, the result of the lock validation determines whether a server session is created and the user 402 is allowed to login or not. The existence of the server session is then taken to be the authentication of the subsequent data requests.

Figure 5:
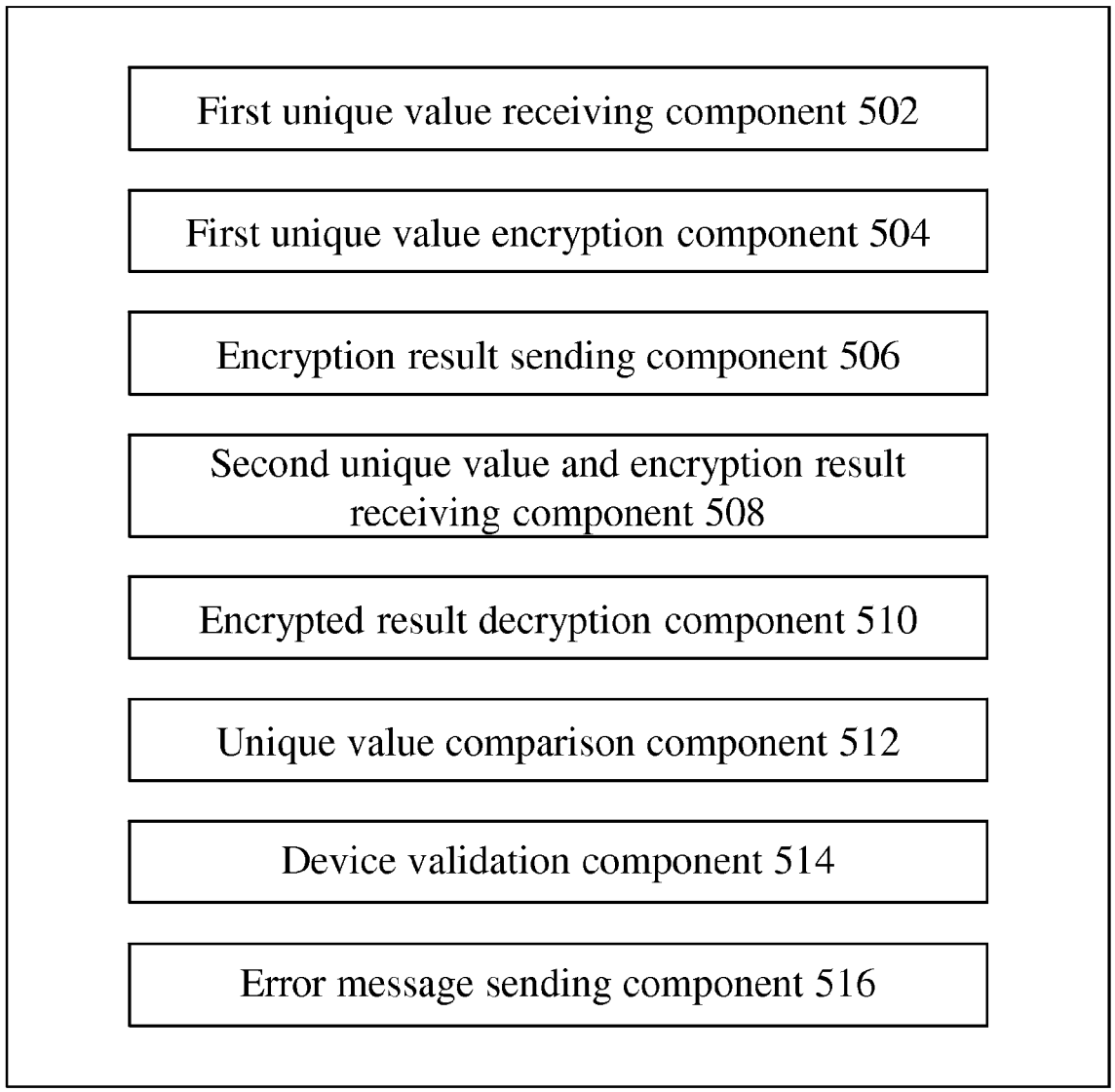
FIG. 5 is a block diagram illustrating a method for locking an application to a device, wherein device information is not stored on server side, comprising machine executable code which when executed by at least one processor, in accordance with embodiments of the present invention.

FIG. 5 is a block diagram illustrating a system for locking an application to a specific hardware. The system includes, first unique value receiving component 502, first unique value encryption component 504, encryption result sending component 506, second unique value and encryption result receiving component 508, encrypted value decrypting component 510, unique value comparison component 512, device validation component 514, and error message sending component 516. The first unique value receiving component 502 is configured to receive first unique value sent by the native application at the first usage. The first unique value is derived based on one or more device parameters. In one embodiment the first unique value is the hardware id of the device. In another embodiment, the first unique value is the combination of hardware id and one or more user specific information. The first unique value encryption component 504 is configured to encrypt the first unique value sent by the native application to the server using a string two-way encryption algorithm. The encryption result sending component 506 is configured to send the encrypted result back to the native application, where the result is stored in pre-defined location on the hardware device. The hardware device determines whether the native application 504 is locked by searching for presence of the encrypted result in the predefined location on the hardware device. The second unique value and encryption result receiving component 508 is configured to receive a second unique value and the encryption result from the device. The encrypted value decryption component 510 is configured to decrypt the encryption result sent by the native application to the server. The unique value comparison component 512 is configured to compare the second unique value and the decrypted value to verify the lock of the native application on the hardware device. The device validation component 514 is configured to validate the native application on the hardware device if the second unique value and the decrypted unique value are identical. The validation is done by sending a response to the request sent by the native application. The error message sending component 516 is configured to send an error message to the native application if second unique value and the decrypted result are not identical.

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

The invention claimed is:

1. A computer implemented method for locking an application to a device, wherein device information is not stored on server side, the method comprising:

receiving, through a processor, a first unique value of a device on first usage of an application, wherein the first unique value is derived based on one or more device parameters;

encrypting, through a processor, the first unique value received from the device;

sending, through a processor, the encryption result to the device, wherein the encryption result is stored in a pre-defined location of the device;

receiving, through a processor, a second unique value of the device and the encryption result at the subsequent usage of the application, wherein the second unique value is derived based on the one or more device parameters;

decrypting, by the processor, the encryption result to get the first unique value received at the time of the first usage of the application;

comparing, by the processor, the decrypted first unique value and the received second unique value; and based on the comparing, choosing between (a) and (b):

(a) if the first unique value and the second unique value are identical, validating the device by the processor and enabling the application; and (b) if the first unique value and the second unique value are not identical, disabling the application.

2. The method of claim 1, further comprises sending an error message if the first unique value and the second unique value are not identical.

3. The method of claim 1, wherein the first and second unique values further include user specific information required by the application for successful functioning.

4. The method of claim 3, wherein the user specific information is sent back to the device during the validation step.

5. The method of claim 1, wherein the first unique value is transferred from the device over a secure channel.

6. The method of claim 1, wherein the device determines if the application is locked by searching for presence of the encryption result in the predefined location of the device.

7. A system for locking an application to a device, wherein device information is not stored on server side, the system comprising:

a computer network;

a server associated with the computer network; and a processor in operable communication with a computer readable storage medium, the computer readable storage medium containing one or more programming instructions whereby the processor is configured to implement:

a first unique value receiving component configured to receive a first unique value of a device on first usage of an application, wherein the first unique value is derived based on one or more device parameters;

an encryption component, configured to encrypt the first unique value received from the device;

an encryption result sending component configured to send the encryption result to the device, wherein the encryption result is stored in a predefined location of the device;

a second unique value receiving component configured to receive a second unique value of the device and the encryption result at the subsequent usage of the application, wherein the second unique value is derived based on the one or more device parameters;

a decryption component configured to decrypt the encryption result to get the first unique value received at the time of the first usage of the application;

a comparison component configured to compare the decrypted first unique value with the received second unique value; and a validation component configured to choose between (a) and (b) based on results of the compare:

(a) if the first unique value and the second unique value are identical, validate the device and enable the application; and (b) if the first unique value and the second unique value are not identical, disable the application.

8. The system of claim 7, further comprises an error message sending component configured to send an error message if the first unique value and the second unique value are not identical.

9. The system of claim 7, wherein the first and second unique values are further derived based on user specific information required by the application for successful functioning.

10. The system of claim 9, wherein the user specific information is sent back to the device during the validation step.

11. The system of claim 7, wherein the first unique value is transferred from the device over a secure channel.

12. The system of claim 7, wherein the device determines if the application is locked by searching for presence of the encryption result in the predefined location of the device.

13. A non-transitory computer readable medium having stored thereon instructions for adapting services of applications, comprising machine executable code which when executed by at least one processor, causes the at least one processor to perform steps comprising:

receiving a first unique value of a device on first usage of an application, wherein the first unique value is derived based on one or more device parameters;

encrypting the first unique value received from the device;

sending the encryption result to the device, wherein the encryption result is stored in a predefined location of the device;

receiving a second unique value of the device and the encryption result at the subsequent usage of the application, wherein the second unique value is derived based on the one or more device parameters;

decrypting the encryption result to get the first unique value received at the time of the first usage of the application;

comparing the decrypted first unique value and the received second unique value; and based on the comparing, choosing between (a) and (b):

(a) if the first unique value and the second unique value are identical, validating the device and enabling the application; and (b) if the first unique value and the second unique value are not identical, disabling the application.

14. The non-transitory computer readable medium of claim 13, further comprises sending an error message if the first unique value and the second unique value are not identical.

15. The non-transitory computer readable medium of claim 13, wherein the first and second unique values further include user specific information required by the application for successful functioning.

16. The non-transitory computer readable medium of claim 15, wherein the user specific information is sent back to the device during the validation step.

* * * * *